United States Patent [19]
Madrid

[11] 3,851,569
[45] Dec. 3, 1974

[54] APPARATUS FOR MAKING SOPAIPILLAS AND THE LIKE

[76] Inventor: Raymond Madrid, 922 Coal Ave., Albuquerque, N. Mex. 87102

[22] Filed: Aug. 19, 1971

[21] Appl. No.: 173,061

[52] U.S. Cl. ................... 99/407, 99/405, 99/450.6, 425/335
[51] Int. Cl. .......................................... A47j 37/12
[58] Field of Search ............ 99/403, 404, 405, 406, 99/407, 443, 353, 450.6; 425/335, 363, 294, 306, 308, 72, 90, 103–104, 404, 333; 100/93 RP

[56] References Cited
UNITED STATES PATENTS

| | | | |
|---|---|---|---|
| 611,422 | 9/1898 | Savery | 100/93 RP |
| 680,135 | 8/1901 | Drew et al. | 100/93 RP |
| 1,401,945 | 12/1921 | Morris | 99/406 |
| 1,509,455 | 9/1924 | Valenta | 425/335 |
| 1,720,097 | 7/1929 | Scholz | 425/294 |
| 2,234,153 | 3/1941 | Herbert | 100/93 RP |
| 2,546,163 | 3/1951 | McBeth | 99/404 |
| 2,800,862 | 7/1957 | Hansen | 425/363 |
| 2,926,597 | 3/1960 | Porambo | 99/405 X |
| 3,520,248 | 7/1970 | Mackendrick | 99/404 X |
| 3,603,270 | 9/1971 | Tangel | 99/450.6 |

*Primary Examiner*—Robert L. Bleutge
*Assistant Examiner*—Arthur O. Henderson
*Attorney, Agent, or Firm*—Shlesinger, Arkwright, Garvey & Dinsmore

[57] ABSTRACT

An apparatus for making sopaipillas and the like including dough rolling means for tensioning dough, dough cutting means, hot-fluid cooking tank means, means for conveying dough from the dough cutting means to the tank means, means for moving dough through the tank means, and means for removing cooked dough from the tank means.

17 Claims, 7 Drawing Figures

INVENTOR.
Raymond Madrid

BY
Shlesinger, Arkwright & Garvey

ATTORNEYS

INVENTOR.
Raymond Madrid
ATTORNEY

APPARATUS FOR MAKING SOPAIPILLAS AND THE LIKE

This invention relates to an apparatus for making sopaipillas and the like, and more particularly to an apparatus for rolling, cutting, handling and cooking of the dough.

Sopaipillas are a type of Mexican food product having a crust-like outer shell and filled with a meat product, vegetable or the like. Formerly, this type of product was made by rolling the dough by hand on a board, followed by the hand cutting of the dough to the desired shape, and subsequent deposition of the cut pieces of dough into a hot-fat cooking tank. When the dough is dropped into the tank, initially it sinks downwardly into the tank and the hot fat, and the ensuing cooking of the dough causes it to puff-up and float on the surface of the fat. The cooking is allowed to continue for a period of time and the cooked dough is then removed from the tank.

After the dough has puffed-up and is floating on the surface of the fat, only the lower portion of each piece of dough is actually in contact with the fat, and in prior art cooking, it was necessary to turn the piece of dough over during the cooking operation so that both sides of the article would be equally cooked. This operation was time consuming to accomplish by hand, or, complicated machinery was required to turn the article over.

Another problem encountered formerly in the making of this type of food product was caused by the nature of the dough. The dough tends to be quite sticky, and is very elastic. In rolling, it was necessary to flour the dough to avoid sticking to the roller.

Accordingly, a primary object of this invention is to overcome the difficulties encountered in making sopaipillas and the like by prior art means.

A further object of this invention is to provide a dough rolling apparatus which prevents sticking of the dough to the rolls.

Still another object of this invention is to provide a dough rolling apparatus which stretches the dough as it is rolled, keeping it under tension.

A further object of this invention is to provide an improved deep fat cooking tank.

Yet another object of this invention is to provide a deep fat cooking tank for buoyant products wherein the products are cooked evenly on both sides thereof without turning.

Yet a further object of this invention is to provide an apparatus for use in making sopaipillas and the like from the dough stage to the point at which filling of the cooked product is to be accomplished.

A still further object of this invention is to provide an apparatus for making sopaipillas and the like which is essentially automatic in its operation.

These and other objects and advantages of this invention will become apparent when considered in light of the following description and claims, when taken together with the drawings in which:

Figure 1:
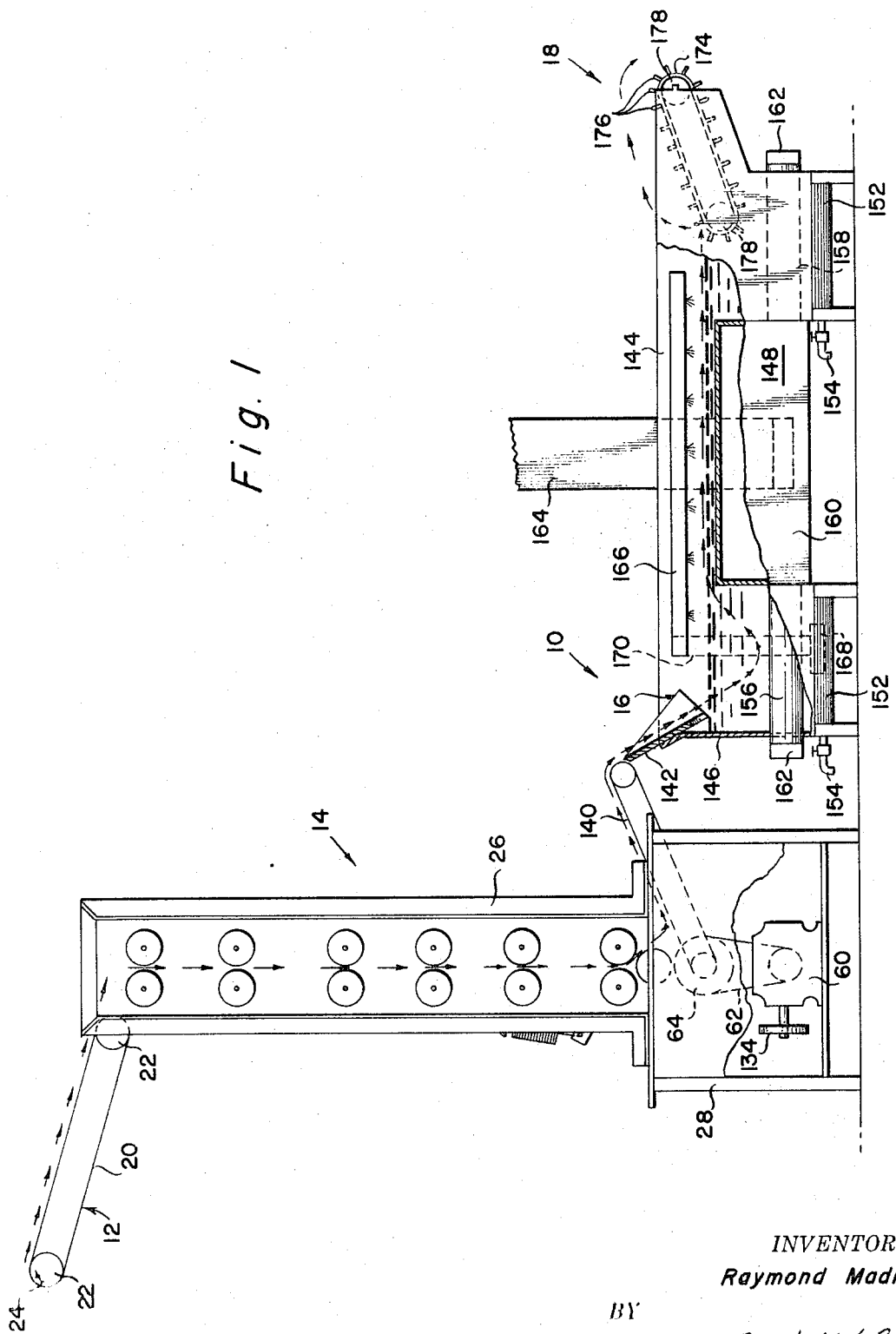
FIG. 1 is a diagrammatic side elevational view of the apparatus of this invention.

Referring now to FIG. 1 of the drawings, the apparatus of this invention is generally designated 10 and is seen to include dough feeding means 12, dough rolling means 14, a cooking tank 16 and product removal means 18.

The dough feeding means 12 includes an endless conveyor type belt 20 supported by two rollers 22. Any suitable means (not shown) is provided to drive the conveyor belt in the direction shown by arrow 24.

The discharge end of the conveyor belt 20 is positioned above the dough rolling section 14. The dough rolling section 14 is seen to include a generally vertically arranged frame 26 mounted on a suitable supporting table 28.

Figure 3:
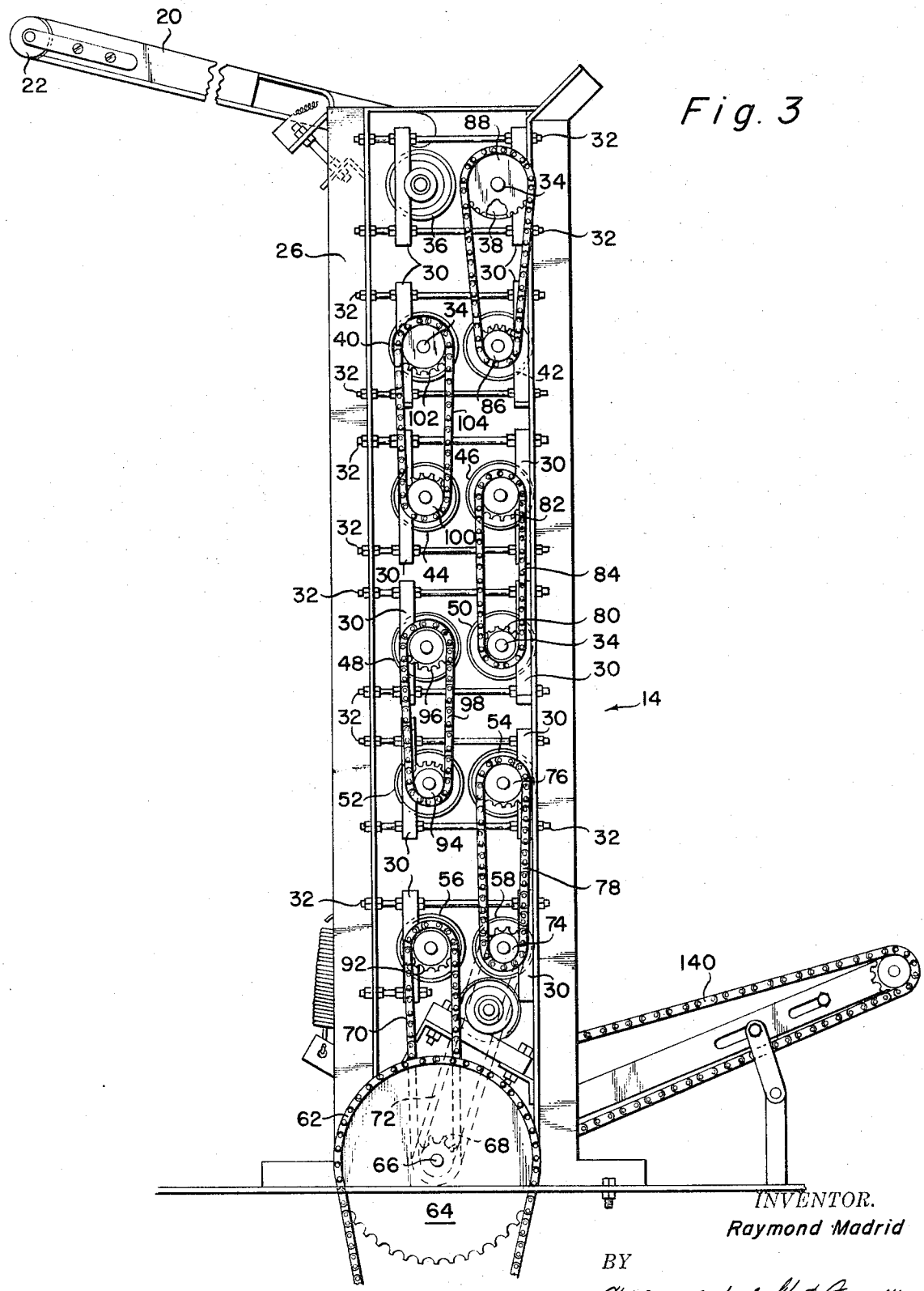
FIG. 3 is a side elevational view of a portion of the apparatus of this invention.

With reference to FIG. 3, the frame 26 is shown to be provided with a plurality of bearing blocks 30 secured to the frame 26 by means of bolts 32. A similar arrangement of bearing blocks is provided on the side of the frame 26 opposite to that shown in FIG. 3. The bearing blocks 30 serve as supports for axles 34. Mounted upon axles 34 and extending between the sides of the frame 26 are roller members 36 and 38, 40 and 42, 44 and 46, 48 and 50, 52 and 54, and 56 and 58. Rollers 36–56 are preferably stainless steel, but could be chrome plated, Teflon coated, or other material, while roller 58 is preferably hard rubber.

The arrangement by which the rolls are driven will now be described. Mounted beneath the support table 28 is a motor 60 connected by a suitable arrangement such as the chain 62 to a drive sprocket 64 supported on an axle 66. Axle 66 is in turn supported by the frame 26. Also supported on axle 66 are two sprockets 68, to one of which is attached a chain 70 for driving roll 56, and to the other of which is attached chain 72 which drives roll 58. Chain 72 drives a 12-tooth sprocket (not shown) on the end of the roll 58 not visible in FIG. 3. A 10-tooth sprocket 74 on roll 58 is connected to a 12-tooth sprocket 76 on roll 54 by means of a chain 78. A 10-tooth sprocket (not shown) is mounted on the other end of roll 54, and is connected to a 12-tooth sprocket (not shown) on roll 50 by means of a chain (not shown) on the other side of the frame from that illustrated in FIG. 3. Motor 60 through a belt (not shown) may be used to drive one of the support rollers 22 to thus drive belt 20.

A 10-tooth sprocket 80 on roll 50 is connected to a 12-tooth sprocket 82 on roll 46 by means of a chain 84. Similarily, on the side of the frame not illustrated in FIG. 3, a 10-tooth sprocket on the other end of roll 46 is connected to a 12-tooth sprocket on the other end of roll 42 by means of a chain (not shown). A 10-tooth sprocket 86 is connected to a 17-tooth sprocket 88 by means of a chain 90. By the arrangement just described, operation of the motor 60 serves to drive each of the rolls 38, 42, 46, 50, 54 and 58, and by means of the gearing reduction, the rotational speed of each of the rolls is incrementally increased from roll 38 to roll 58, with roll 38 being the slowest and roll 58 being the fastest.

Roll 56 is provided with a 12-tooth sprocket 92 which is driven by chain 70. On the other end of roll 56 is a 10-tooth sprocket (not shown) which is connected to a 12-tooth sprocket (not shown) on the other end of roll 52 by means of a suitable chain (not shown). A 10-tooth sprocket 94 is connected to a 12-tooth sprocket 96 on roll 48 by means of a chain 98. On the other end of roll 48 is provided a 10-tooth sprocket (not shown) connected to a 12-tooth sprocket (not shown) on the other end of roll 44 by means of a chain (not shown).

Roll 44 is also provided with a 12-tooth sprocket 100 which is connected to a 13-tooth sprocket 102 by means of a chain 104. On the other end of roll 40 is provided a 10-tooth sprocket (not shown) which is connected to a 17-tooth sprocket (not shown) on the other end of roll 36 by means of a chain (not shown). In this manner, actuation of the motor 60 serves to drive rolls 36, 40, 44, 48, 52 and 56 in progressively increasing speed increments with roll 36 being the slowest, and roll 56 being the fastest. Also, this arrangement provides that rolls 56 and 58 are rotated at the same speed, rolls 52 and 54 are rotated at the same speed but slower than rolls 56 and 58, rolls 48 and 50 are driven at the same speed but slower than rolls 52 and 54, rolls 44 and 46 are driven at the same speed, but slower than rolls 48 and 50, rolls 40 and 42 are driven at the same speed, but slower than rolls 44 and 46, and rolls 36 and 38 are driven at the same speed, but slower than rolls 42 and 40.

Figure 6:
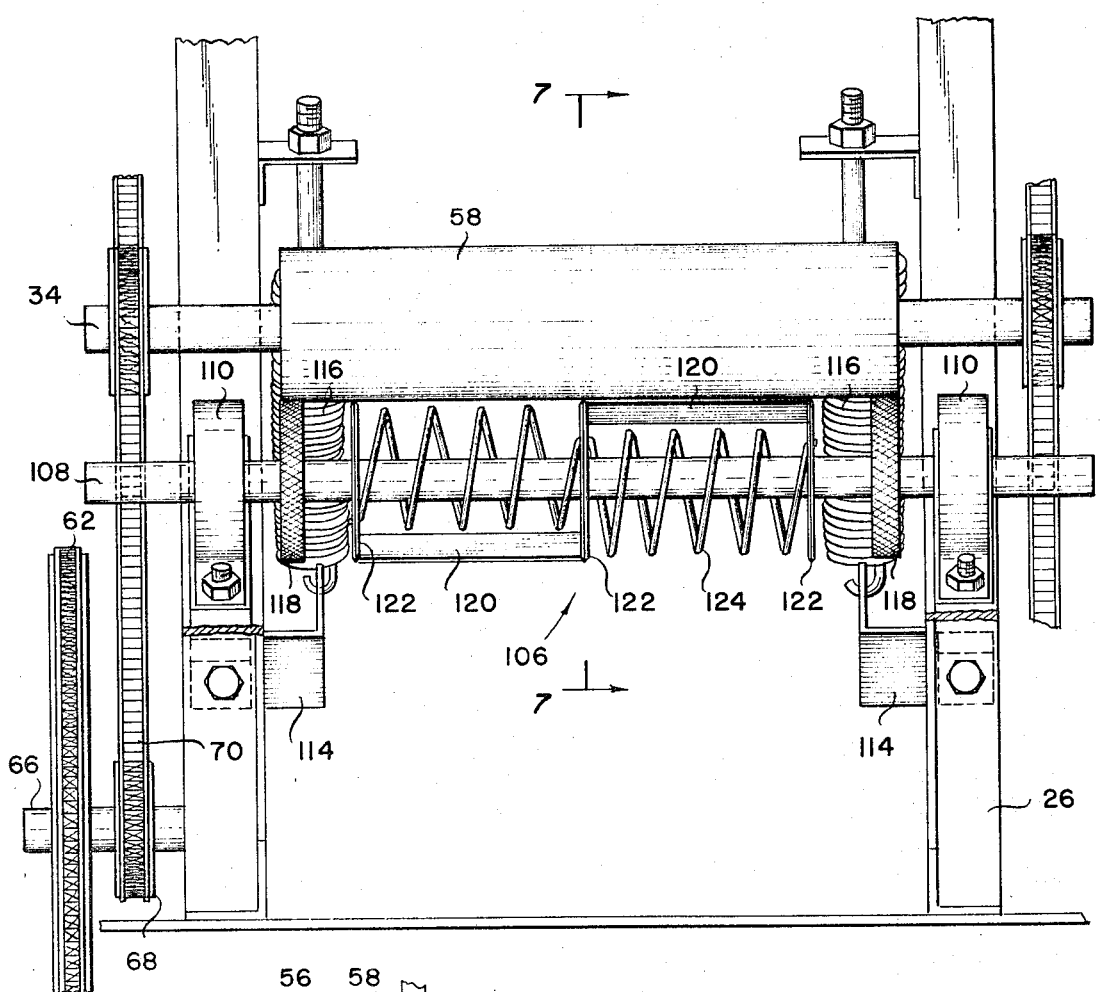
FIG. 6 is a fragmentary plan view of a portion of the apparatus of this invention.
Figure 7:
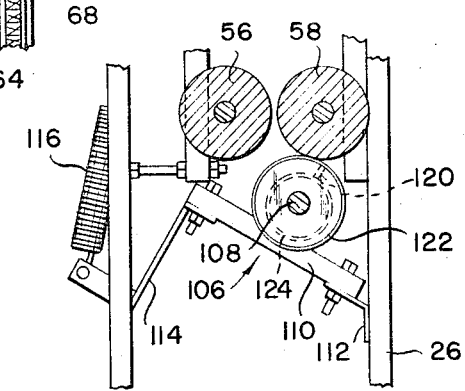
FIG. 7 is a sectional view along lines 7—7 of FIG. 6 and viewed in the direction of the arrows.

With reference now to FIGS. 3, 6 and 7, a cutter roller 106 is mounted upon an axle 108 which is secured in bearing blocks 110. Bearing blocks 110 are attached to frame 26 by means of a hinge 112. Also attached to bearing block 110 is a bracket 114. Springs 116 are arranged so as to urge the cutter roller 106 in a clockwise direction about hinge 112 and thus resiliently urge the cutter blades 120 against roll 58.

Roll 58 is preferably a hard rubber roller. Mounted on axle 108 for engagement with roller 58 are a pair of friction wheels 118. In this manner, rotation of roll 58 serves also to rotate cutter roll 106. Cutter roll 106 is seen to include a pair of cutter knives 120 supported by members 122. A helically wound length of wire 124 is positioned around the axle 108 and is also secured to the support members 122. Wire 124 serves to prevent dough from being wrapped around axle 108 and clogging the cutter 106.

Figure 5:
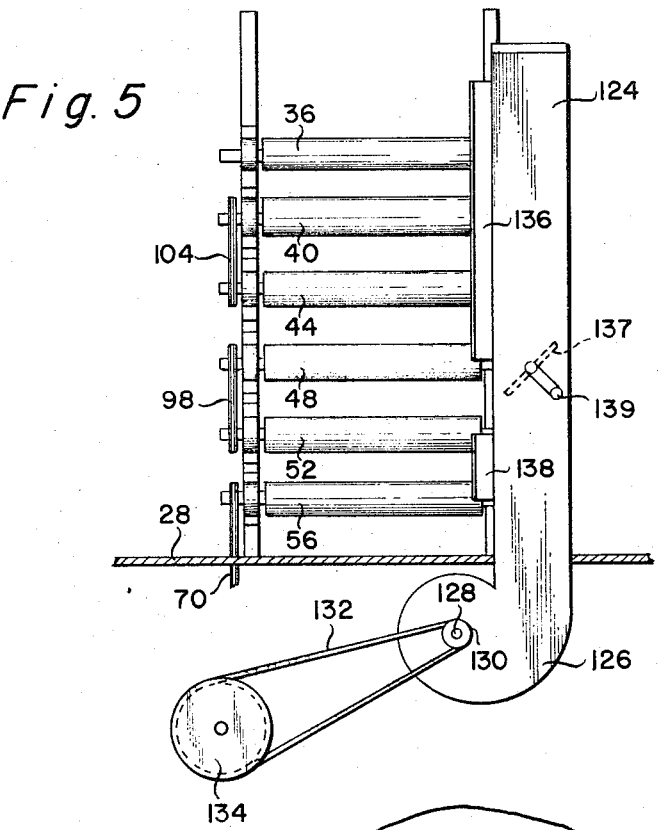
FIG. 5 is a view along lines 5—5 of FIG. 4 and viewed in the direction of the arrows.
Figure 4:
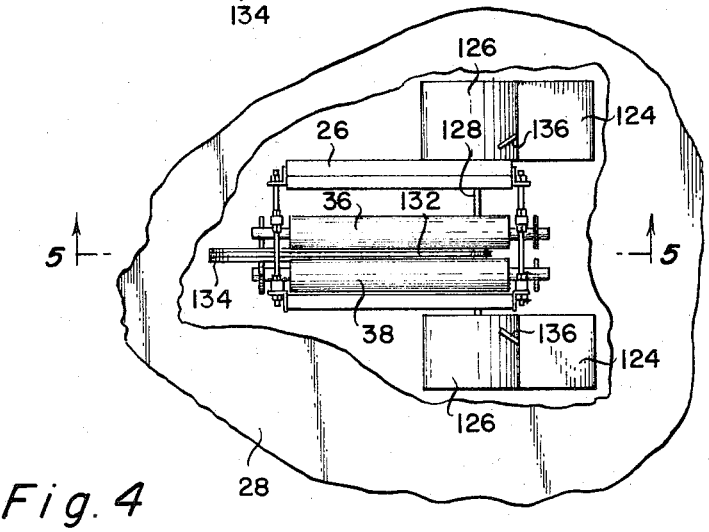
FIG. 4 is a top plan view of the portion of the apparatus shown in FIG. 3.

Referring now to FIGS. 4 and 5, the means by which dough is prevented from sticking to the rollers 36 through 58 will now be described. Positioned along side of frame 26 are a pair of duct members 124. At the bottom end of duct members 124 are a pair of blowers 126 which are preferably of the squirrel cage type. The blowers 126 are mounted upon a common axle 128 to which is secured a suitable pulley 130. A belt 132 connects pulley 130 with a pulley 134 driven by motor 60.

Ducts 124 include outlets 136 and 138 which are arranged to divert air onto the rolls 36–58. It has been found that this forcing of air onto the rolls serves to keep the rolls dry and prevent sticking of the dough to the rolls. The rolls preferably are stainless steel, and the volume of air is such as to permit ready drying of the rolls as the apparatus is operated. This method of preventing the sticking of dough to the rolls has been found to be far superior to dusting of the rolls with flour which obviously can be a rather messy operation. A damper valve 137 may be provided in ducts 124 and may include a handle 139 to permit adjustment of the air flow.

Referring again to FIG. 3, a chain or other suitable type conveyor 140 is provided with its receiving end positioned just below the cutter roller 106 so as to receive pieces of dough after they are cut. The conveyor 140 is driven by motor 60 by a belt and sprocket mechanism (not shown).

In operation of the portion of the invention thus far described, a dough which has been mixed up in a suitable mixer is placed upon the conveyor belt 20, and passes in the direction of the arrows into the rolling section 14 at the upper end thereof. The rolls 36–58 draw the dough through the rolling section 14, and since the rolls are progressively increasing in speed as the dough passes through the roll section 14, the dough is placed under tension within the rolling section 14. In addition to providing the necessary working of the dough, the tension serves to stretch the dough and eliminate any build-up of dough as it is flattened while passing through the rollers. At the cutter roller 106, the dough is cut into pieces of a desired shape and the pieces then falling onto the conveyor 140.

Figure 2:
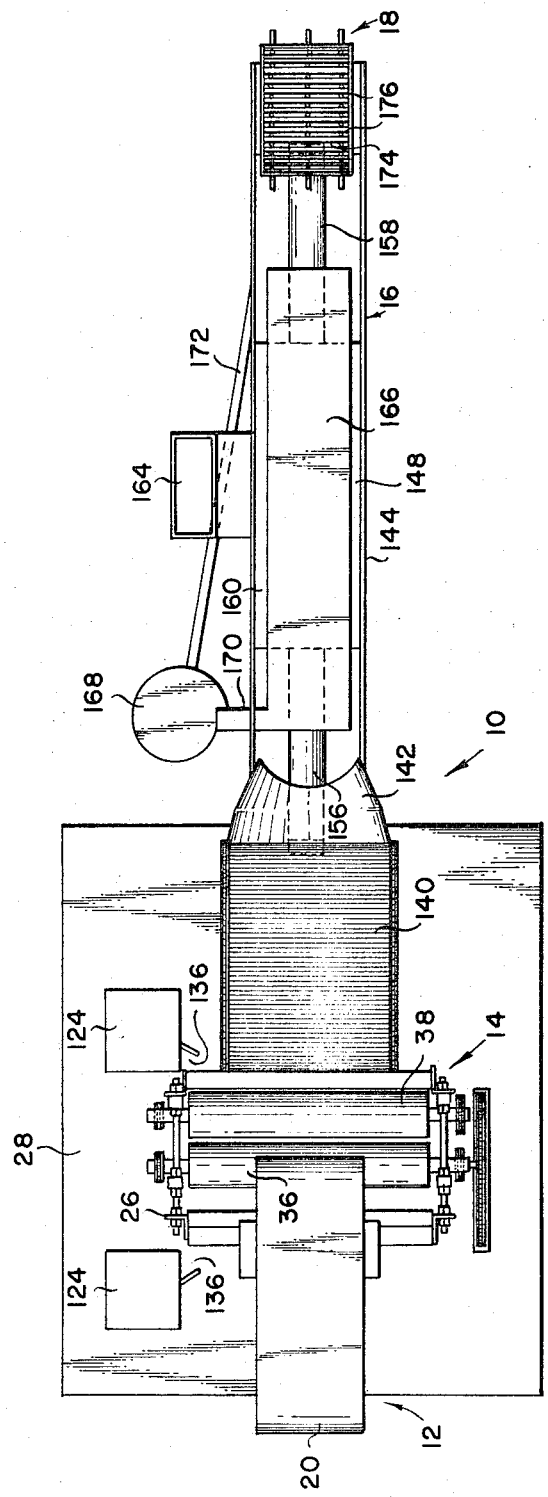
FIG. 2 is a top plan view of the apparatus of this invention.

From the conveyor 140, referring now to the cooking tank arrangement 16 as best seen in FIGS. 1 and 2, conveyor 140 is provided with a chute 142 for discharging the pieces of dough into a receptacle 144. The receptacle 144 is generally rectangular in shape and has a relatively deep receiving end 146, a relatively shallow central portion 148, and a discharge section 150 which is preferably as deep as the receiving end 146, but could be shallower if desired. The receptacle 144 preferably has a V-shaped bottom 152 and is provided with drains 154. Drains 154 permit removal of the fat when desired as well as any sediment which collects at the bottom of the receptacle 144.

Extending through the receiving end 146 of receptacle 144 is a burner tube 156, and passing through the discharge end 150 of receptacle 144 is a burner tube 158. Burner tubes 156 and 158 are open at their outer ends and open into a vent chamber 160 at their inner ends. Burners 162 are positioned at the outer ends of burner tubes 156 and 158 for directing heat into the tubes. Preferably, the burners are gas fired and thermostatically controlled as a function of the temperature of the fat in the receptacle 144. Vent chamber 160 is provided with a duct 164 which is vented to the outside.

Positioned above the receptacle 144 is a manifold type sprinkler head 166. The sprinkler head 166 is connected to the discharge side of a pump 168 by means of suitable tubing 170. The inlet side of the pump 168 is connected to the discharge end 150 of receptacle 144 by means of suitable tubing 172. The pump 168 is driven by any suitable motor (not shown) or could be connected with motor 60 through suitable driving connections if desired. The hot fat from receptacle 144 is drawn through the tube 172 by the pump and is forced through tube 170 to sprinkler head 166.

Near the discharge end 150 of receptacle 144 is the conveyor 20 for removing the cooked product from the receptacle 144. Conveyor 20 includes a conveyor belt 174 having a plurality of fingers 176 extending therefrom and substantially normal thereto. Belt 174 is supported by means of rollers 178 and may be driven by a motor such as 60. The fingers 176 preferably dip slightly into the hot fat and serve to pick the cooked product out of the fat. Alternatively, other product removal means could be provided such as lifters or the like.

In operation, after the dough has been cut as previously described, it falls down chute 142 which directs it into the hot fat in receptacle 144. Initially, the dough is rather dense and sinks down into the fat at the receiving end 146 of receptacle 144. After it is heated, the dough puffs up rapidly and becomes buoyant, thereby floating on the top of the fat in the receptacle 144. Since the intake of pump 168 is connected by means of tubing 172 to the discharge end 150 of receptacle 144, there is established a flow of the hot fat from the receiving end 146 to the discharge end 150. This fluid flow conveys the pieces of dough through the receptacle 144 from one end to the other. If desired, the discharge of sprinkler head 166 can be angularly disposed with respect to the level of the fat in the receptacle 144 and thus the impingement of the hot fat from the sprinkler head 166 upon the pieces of dough at an angle will also assist in moving the dough through the receptacle. By the time the pieces of dough have traveled the full length of the receptacle 144, they are cooked to the proper level of doneness and are removed from the hot fat by means of the conveyor 18.

It has been found that for optimum results, and the best quality of finished products, the temperature of the fat in the receptacle 144 should be maintained between 375° and 400°F. Also the speed of the pump can be adjusted to correspond to the length of receptacle 144 to attain the proper amount of cooking of the dough.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. An apparatus for making sopaipillas and the like including:
   a. a plurality of linearly spaced pairs of opposed roll members, the periphery of each set of roll members in a given pair being spaced from each other so as to engage and pass a strip of dough therebetween,
   b. the surfaces of successive pairs of roll members moving at greater pheripheral velocities to contract, squeeze and stretch the dough strip moving therebetween under tension and at a progressively greater speed,
   c. air supply means adjacent each of the roll members for supplying a continuous stream of air along the periphery of each roll member for maintaining the entire periphery thereof in a dry condition and thereby preventing particles of the strip of dough from sticking to the roll members,
   d. means for cutting dough sections from the lengthened strip of dough after the dough strip has passed through the plurality of linearly spaced pairs of opposed roll members,
   e. an elongated bath of heated cooking oil contained in an elongated receptacle into which the cut dough sections are dropped at one end of the receptacle,
   f. means for moving the dough sections through the bath of heated cooking oil from said one end of the receptacle to the far end thereof,
   g. means for removing the cooked dough sections from the bath of heated cooking oil at the far end.

2. An apparatus as in claim 1 and wherein:
   a. each roll member of each of said pairs of roll members is spaced horizontally from the other member of said pair, and
   b. said pairs of roll members are vertically aligned.

3. An apparatus as in claim 1 and wherein said means for directing air includes blower means and duct means for conveying air from said blower means to said roll members.

4. An apparatus as in claim 3 and wherein:
   a. said blower means includes first and second blower members,
   b. said duct means includes first and second duct members,
   c. said first duct member extends from one of said blower members to one side of said rolling means,
   d. said second duct member extends from the other of said blower members to the other side of said rolling means.

5. An apparatus as in claim 1 and wherein:
   a. said dough cutting means is positioned beneath said rolling means.

6. An apparatus as in claim 1 and wherein:
   a. said receptacle is elongated and includes a relatively deep end and a relatively shallow portion,
   b. said deep end being positioned adjacent said conveying means.

7. An apparatus as in claim 6 and wherein:
   a. said heating means includes a burner tube in said receptacle means, and
   b. burner means in said burner tube.

8. An apparatus as in claim 7 and wherein:
   a. said moving means includes fluid circulating means.

9. An apparatus as in claim 8 and wherein:
   a. said fluid circulating means includes pump means.

10. An apparatus as in claim 9 and wherein:
    a. said fluid circulating means further includes spray means positioned above said receptacle for spraying hot fluid onto dough in said receptacle.

11. An apparatus as in claim 10 and wherein:
    a. said spray means includes a manifold for distributing the fluid substantially throughout the length of said receptacle.

12. An apparatus as in claim 1 and wherein:
    a. said removing means includes an endless conveyor belt.

13. An apparatus as set forth in claim 1, wherein:
    a. driving means is connected to the roll members for rotating each pair of roll members at a different speed and includes a motor and gearing,
    b. the gearing being connected between the motor and the pairs of roll members so that a pair of roll members is rotated at the same speed, and each successive pair of roll members is driven at a high speed.

14. An apparatus as set forth in claim 1, wherein:
a. the air supply means includes an elongated duct with an air blower, and
b. the elongated duct is disposed adjacent the ends of the roll members and has air directing means adjacent the ends of the roll members for directing air along the length thereof.

15. An apparatus as in claim 14 and wherein:
a. the air directing means includes an opening immediately adjacent the roll members which has an inclined outlet member.

16. An apparatus as in claim 15 and wherein:
a. dough feeding means is disposed immediately adjacent and above the first set of roll members.

17. An apparatus as in claim 1 and wherein:
a. the successive pairs of rollers are disposed in vertical alignment,
b. the air supply means includes a vertically extending elongated duct disposed on each side of the successive pairs of roll members which have openings adjacent the roll members through which air passes.

* * * * *